I. M. BALDWIN.
AUTOMATIC VALVE OPERATING MECHANISM.
APPLICATION FILED FEB. 17, 1914.
1,173,764.
Patented Feb. 29, 1916.
3 SHEETS—SHEET 2.
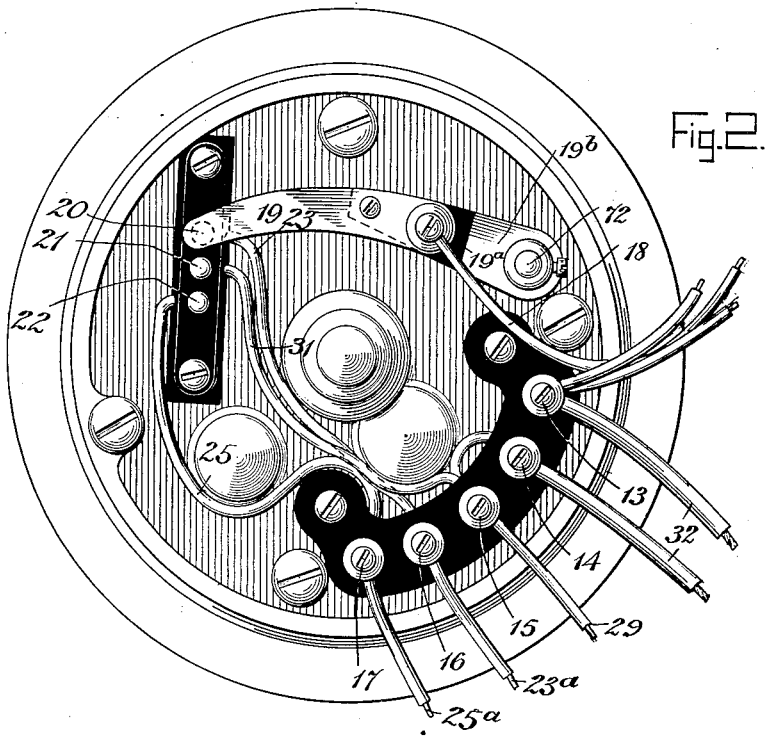
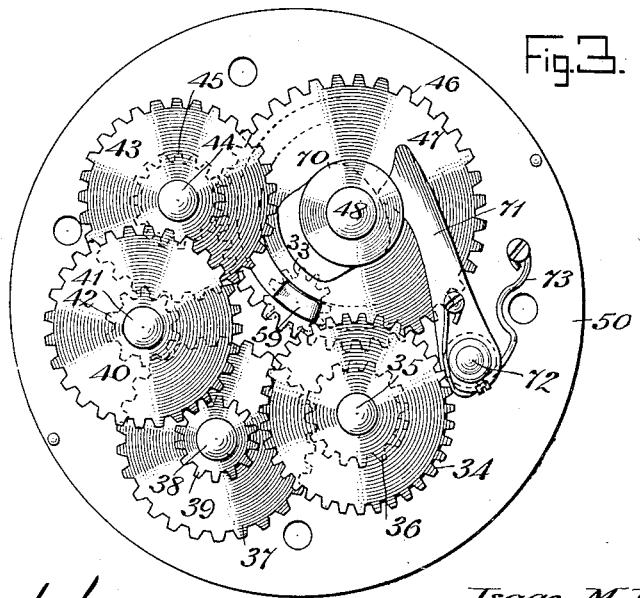
WITNESSES
INVENTOR
Isaac M. Baldwin
BY
ATTORNEYS I. M. BALDWIN.
AUTOMATIC VALVE OPERATING MECHANISM.
APPLICATION FILED FEB. 17, 1914.
1,173,764.  Patented Feb. 29, 1916.
3 SHEETS—SHEET 3.
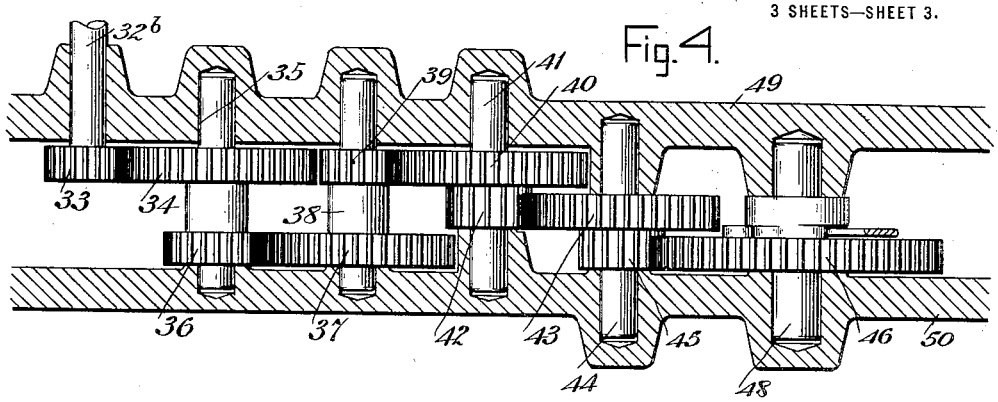
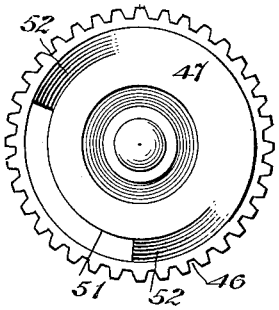
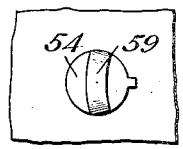
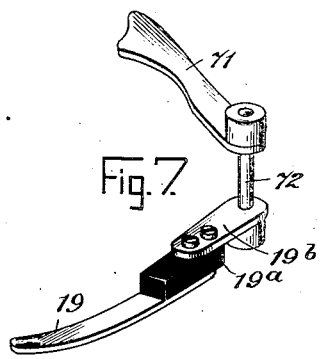
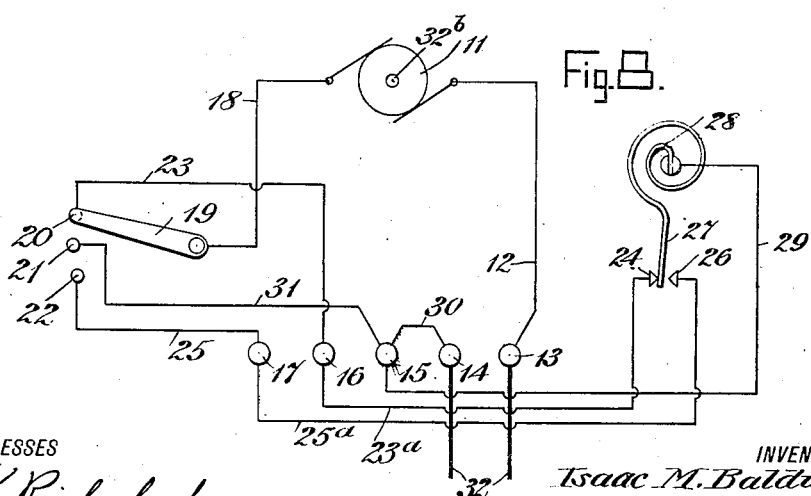
WITNESSES
C. H. Reichenbach.
E. B. Marshall
INVENTOR
Isaac M. Baldwin
BY
ATTORNEYS

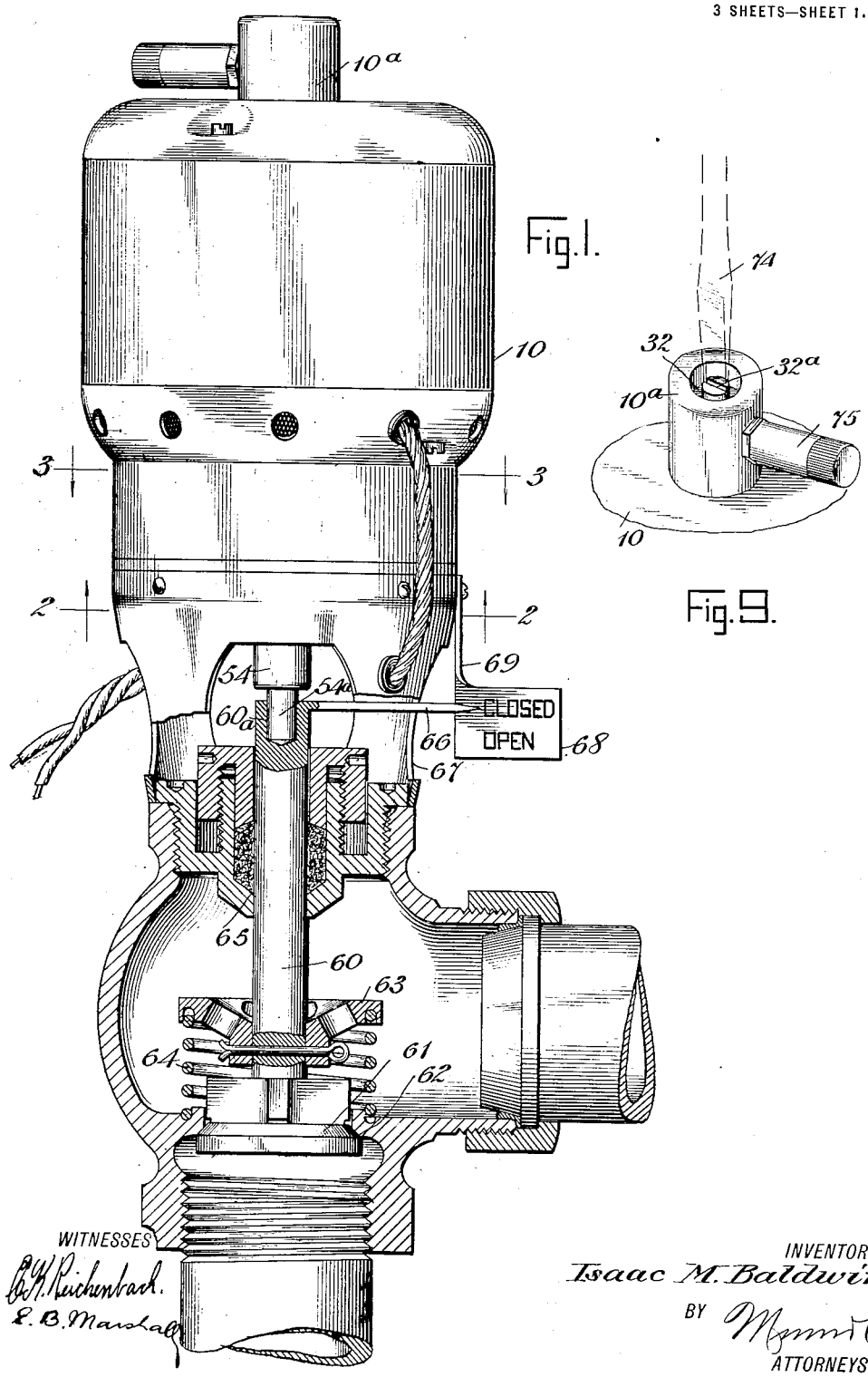

UNITED STATES PATENT OFFICE.

ISAAC M. BALDWIN, OF WELLSBURG, NEW YORK, ASSIGNOR TO AMERICAN THERMOSTAT CO., OF ELMIRA, NEW YORK.

AUTOMATIC VALVE-OPERATING MECHANISM.

1,173,764.  Specification of Letters Patent.  Patented Feb. 29, 1916.

Application filed February 17, 1914. Serial No. 819,137.

*To all whom it may concern:*

Be it known that I, ISAAC M. BALDWIN, a citizen of the United States, and a resident of Wellsburg, in the county of Chemung and State of New York, have invented a new and Improved Automatic Valve-Operating Mechanism, of which the following is a full, clear, and exact description.

My invention has for its object to provide means for operating valves which may be connected with a thermostat to be actuated thereby. The thermostat has means for closing circuits connected for driving a motor for rotating a wheel or disk which has cams for engaging a thrust rod connected with a valve stem for operating the valve. The wheel or disk also has a cam with operating means for opening one of the said circuits and closing another circuit connected with the motor so that after the motor has been started by the closing of the circuit at the thermostat, the motor will continue running for a period even if the thermostat should move to open the circuit disposed at the thermostat.

Additional objects of the invention will appear in the following specification in which the preferred form of my invention is disclosed.

In the drawings similar reference characters refer to similar parts in all the views in which—

Figure 1 is a view showing the valve in elevation with parts broken away to show the operating mechanism; Fig. 2 is a sectional view on the line 2—2 of Fig. 1; Fig. 3 is a sectional view on the line 3—3 of Fig. 1; Fig. 4 is a view illustrating the gearing; Fig. 5 is a view showing the gear wheel with its cams for operating a thrust rod connected with the valve; Fig. 6 illustrates in two views, the construction of the thrust rod; Fig. 7 is a perspective view illustrating the construction of the switch arm and the operating arm by which it is moved to open and close the circuits; Fig. 8 is a diagrammatic view showing the several circuits and Fig. 9 is a view showing how the valve may be operated manually.

By referring to the drawings, it will be seen that a casing 10 is provided in which is disposed an electrical power member such as a motor 11 as shown in Fig. 8 of the drawings, a wire 12 leading from the binding post 13 to the motor, a wire 18 leading from the motor to the switch arm 19 which is adapted to move into electrical engagement with the contact points 20, 21 and 22. The contact point 22 is connected by a wire 25 with the binding post 17 and the binding post 17 is connected by a wire 25$^a$ with the contact point 26. The contact point 20 is connected by a wire 23 with a binding post 16 and the binding post 16 is connected by a wire 23$^a$ with a contact point 24, a movable member 27 of a thermostat 28 is disposed between the contact points 24 and 26 which are spaced apart. This thermostat 28 is connected by a wire 29 with a binding post 15, the binding post 15 being connected by a wire 30 with a binding post 14 and the binding post 15 being also connected by a wire 31 with the contact point 21.

With the construction which has been described and with the current led to the binding post 13 and from the binding post 14 by the wires 32, this current will pass through the wires 12 to the motor 11 to operate the motor, then through the wire 18, and the switch arm 19, the wire 23 to the binding post 16, the wire 23$^a$ to the contact point 24, thence through the movable arm 27 to the thermostat 28, through the thermostat 28, the wire 29 to the binding post 15 and the wire 30 to the binding post 14. The motor is connected by means which will shortly be described with the switch arm 19 for moving the switch arm 19 as the motor rotates. As the motor 11 rotates, the switch arm 19 will be moved first out of contact with the contact point 20 and into electrical engagement with the contact point 21. This will open the circuit which has been described and close the following circuit: from the binding post 13 to the wires 12 to the motor 11, the wire 18 to the switch arm 19, the contact point 21, the wire 31, the binding post 15, the wire 30 to the binding post 14. With the continued rotation of the motor 11, the switch arm 19 will be moved out of engagement with the contact point 21 to open the last circuit which has been described and the switch arm 19 will be moved into electrical engagement with the contact point 22 to close the following circuit when the arm 27 of the thermostat 28 is moved into engagement with the contact point 26. This circuit is from the binding post 13, the wires 12 to the motor 11, the wire 18 to the switch arm 19, the contact point 22, the wire 25 to the binding post 17, the wire 25ª to the contact point 26, the arm 27, the thermostat 28, the wire 29 to the binding post 15 and the wire 30 to the binding post 14.

It will be seen that after the motor has been started by the movement of the thermostat arm 27 to close the circuit the motor will continue running even should the circuit at the thermostat be broken; this being so for after the motor has run a short interval the switch arm 19 will be brought into electrical engagement with the contact point 21 to close a circuit independently of the thermostat 28 to operate the motor 11.

The motor has a shaft 32ᵇ with a pinion 33 thereon which meshes with a gear 34 at a stud 35, a pinion 36 being also mounted on the stud 35 which meshes with a gear 37 secured to a stud 38, a pinion 39 being secured to this stud 38 for meshing with a gear 40, secured to a stud 41, a pinion 42 being also secured to a stud 41 which meshes with gear 43 secured to a stud 44 to which a pinion 45 is also secured. This pinion 45 meshes with a gear 46 on a disk 47. The motor shaft 32 and the studs 35, 38, 41, 44 and the stud 48, to which the disk 47 is secured, are journaled in the plates 49 and 50. The disk 47 has a slot 51 curved concentrically with its axis, the disk 47 having cam or inclined surfaces 52 at each end of the curved slot 51. Disposed for moving in a sleeve 53 of the casing, there is thrust rod 54, the thrust rod 54 having a key 55 for moving in a key slot 56 in the sleeve to prevent the rotation of the thrust rod 54 relatively to the sleeve 53. A pin 57 also projects from the sleeve 53 into the slot 58 in the thrust rod 54 to limit the movement of the thrust rod 54 longitudinally of the axis. The thrust rod 54 engages the disk 47, the thrust rod 54 being forced down with the rotation of the disk 47, the curved surface of the projection 59 being engaged by the inclined or cam portions 52 of the disk 47 to move the projection 59 against the underside of the disk 47. When the thrust rod 54 is held down in this manner it serves to hold down the valve stem 60 which is secured to a valve 61 provided for seating against the valve seat 62. Secured to the valve stem 60 there is a collar 63, a spring 64 being disposed between the collar 63 and the valve seat 62, for holding the valve stem 60 yieldingly upward with the valve 61 seated against the valve seat 62, thereby closing the valve. The valve seat 62 is normally closed, but as has been stated, when the projection 59 on the thrust rod 54 engages the underside of the disk 47, the thrust rod 54 is pushed down, and with it, the valve stem 60 moves the valve 61 down out of engagement with the valve seat 62. The valve stem 60 passes through packing members 65 to prevent any escape of steam or other fluid flowing through the valve seat 62. Projecting from the upper portion of the valve stem 60 there is an arm 66, the arm 66 extending through a slot 67 in the casing 10 for indicating the position of the valve 61 relatively to the valve seat 62. A plate 68 is held by its arm 69 relatively to the casing, and on this plate 68, the words "Closed" and "Open" are written, so that these words, in connection with the arm 66, will readily indicate whether the valve is open or closed. In addition to the inclined or cam surfaces 52, the disk 47 is also provided with a cam 70, against which is disposed an arm 71, the arm 71 being secured to the pivot pin 72, and being held in engagement with the cam 70 by the spring 73, this pivot pin 72 being journaled in a bearing in the plate 50. The switch arm 19 is also secured to this pivot pin 72, the switch arm 19 having an insulating member 19ª which separates it from its base 19ᵇ. It will, therefore, be seen that with the rotation of the disk 47, by means of the motor and the gearing, which have been described, the cam 70 will move the arm 71 and the pivot pin 72 to operate the switch arm 19 in the manner which has been described.

The top of the casing 10 has a collar 10ª in which the motor shaft extends, this motor shaft 32 having a slot 32ª for receiving a screw-driver or key 74 by which the motor may be turned to operate the valve should, for any reason, the current fail. The collar 10ª has a threaded opening in which meshes a thread on the lubricant member 75.

Having thus described my invention, I claim as new and desire to secure by Letters Patent:

1. In an automatic valve operating mechanism, two contact points spaced apart, a thermostat for moving into electrical communication with the contact points, one at a time, three additional contact points, a switch arm for moving into electrical communication with the three additional contact points, an electrical power member for operating a valve, a conductor connecting one of the end contact points of the three additional contact points with one of the first mentioned contact points, a conductor connecting the other end contact point of the three additional contact points with the other of the first two mentioned contact points, a conductor adapted to be connected with a source of electro-motive-force and having branches connected with the thermostat and with the other of the three additional contact points, a conductor adapted to be connected with a source of electro-motive-force and connected with the electrical power member, and another conductor connecting the electrical power member with the switch arm, for completing an operating circuit through the said other of the three additional contact points, and independently of the thermostat.

2. In an automatic valve operating mechanism, two contact points spaced apart, a thermostat for moving into electrical communication with the contact points, one at a time, three additional contact points, a switch arm for moving into electrical communication with the three additional contact points, an electrical power member for operating a valve, a conductor connecting one of the end contact points of the three additional contact points with one of the first mentioned contact points, a conductor connecting the other end contact point of the three additional contact points with the other of the first two mentioned contact points, a conductor adapted to be connected with a source of electro-motive-force and having branches connected with the thermostat and with the other of the three additional contact points, a conductor adapted to be connected with a source of electro-motive-force and connected with the electrical power member, a conductor connecting the electrical power member with the switch arm for completing an operating circuit through the said other of the three additional contact points and independently of the thermostat, and means connecting the electrical power member with the switch arm for operating the latter.

3. In an automatic valve operating mechanism, two contact points, a thermostat having a movable member, for engaging the contact points, one at a time, an electrical power member for operating a valve, a conductor connected with the body of the thermostat, a circuit for energizing the electrical power member and independent of the thermostat, the circuit being adapted to be connected with a source of electro-motive-force, and means movable by the electrical power member for connecting the circuit with the contact points, one at a time for completing with the conductor a new circuit through the thermostat and the electrical power member.

4. In an automatic valve operating mechanism, an electrical power member for operating a valve, a thermostat having a movable member, a circuit independent of the thermostat for operating the electrical power member, the circuit being adapted to be connected with a source of electro-motive-force, two electrical communicating means for engagement by the movable member of the thermostat, a switch arm in the circuit for breaking the latter and for engagement with either one of the said two electrical communicating means, and an electrical communicating means connecting the body of the thermostat with the circuit for completing a circuit through the thermostat and the electrical power member, when the switch arm engages one of the said two electrical communicating means after the switch arm has been moved to break the first circuit.

5. In an automatic valve operating mechanism, an electrical power member for operating a valve, a thermostat having a movable member, a circuit independent of the thermostat for operating the electrical power member, the circuit being adapted to be connected with a source of electro-motive-force, two electrical communicating means for engagement by the movable member of the thermostat, a switch arm operable by the electrical power member, the switch arm being in the circuit for breaking the latter and for engagement with either one of the said two electrical communicating means, and an electrical communicating means connecting the body of the thermostat with the circuit for completing a circuit through the thermostat and the electrical power member, when the switch arm engages one of the said two electrical communicating means after the switch arm has been moved to break the first circuit.

6. In an automatic valve operating mechanism, an electrical power member, a thermostat having a movable member, a circuit independent of the thermostat for operating the electrical power member, the circuit being adapted to be connected with a source of electro-motive-force, two electrical communicating means for engagement by the movable member of the thermostat, a switch arm in the circuit for breaking the latter and for engagement with either one of the said two electrical communicating means, an electrical communicating means connecting the body of the thermostat with the circuit for completing a circuit through the thermostat and the electrical power member when the switch arm engages one of the said two electrical communicating means after the switch arm has been moved to break the first circuit, and a valve operable by the electrical power member.

7. In an automatic valve operating mechanism, an electrical power member, a thermostat having a movable member, a circuit independent of the thermostat for operating the electrical power member, the circuit being adapted to be connected with a source of electro-motive-force, two electrical communicating means for engagement by the movable member of the thermostat, a switch arm operable by the electrical power member, the switch arm being in the circuit for breaking the latter and for engagement with either one of the said two electrical communicating means, electrical communicating means connecting the body of the thermostat with the circuit for completing a circuit through the thermostat and the electrical power member when the switch arm engages one of the said two electrical communicating means after the switch arm has been moved to break the first circuit, a valve seat, a valve for coöperating with the valve seat operable by the electrical power member, and resilient means for holding the valve member yieldingly in predetermined position relatively to the valve seat.

8. In an automatic valve operating mechanism, an electrical power member, a thermostat having a movable member, a circuit independent of the thermostat for operating the electrical power member, the circuit being adapted to be connected with a source of electro-motive-force, two electrical communicating means for engagement by the movable member of the thermostat, a switch arm in the circuit for breaking the latter and for engagement with either one of the said two electrical communicating means, an electrical communicating means connecting the body of the thermostat with the circuit for completing a circuit through the thermostat and the electrical power member when the switch arm engages one of the said two electrical communicating means after the switch arm has been moved to break the first circuit, a rotatably mounted cam, means operable by the electrical power member for rotating the cam, and an arm engaging the cam and secured for operating the switch arm.

9. In an automatic valve operating mechanism, an electrical power member, a circuit energizing the electrical power member, a thermostat for moving in the circuit, a switch arm actuated by the electrical power member, and electrical communicating means for engagement by the switch arm for completing a circuit independently of the thermostat for energizing the electrical power member.

10. In an automatic valve operating mechanism, an electrical motor, a circuit for energizing the electrical motor, a thermostat having a movable member in the circuit, a disk, means by which the motor is adapted to rotate the disk, two cams on the disk, a pivoted arm for engaging one cam to be operated thereby, a switch in the circuit actuated by the pivoted arm, electrical communicating means for engagement by the switch arm for completing a circuit independently of the thermostat for energizing the electrical motor, a valve seat, a valve for coöperating with the valve seat, and means operable by the other cam for moving the valve relatively to the switch.

11. In an automatic valve operating mechanism, a valve seat, a valve for coöperating therewith, a rotatable member having an opening with cams at its ends, a thrust rod for operating the valve and adapted to move into the opening and to be operated by the cams and held in position by the body of the disk, an electrical motor, means connecting the motor with the disk for rotating the latter, a circuit for the electrical motor, a thermostat having a movable member in the circuit, a switch arm, means actuated by the disk for moving the switch arm, and electrical communicating means for engagement by the switch arm for completing the circuit independently of the thermostat for energizing the electrical motor.

In witness whereof I have signed my name to this specification in the presence of the two subscribing witnesses.

ISAAC M. BALDWIN.

Witnesses:
TIBA RUBIN,
ALBERT S. BEVENS.